United States Patent [19]

Chester et al.

[11] 4,137,152

[45] Jan. 30, 1979

[54] SELECTIVE HIGH CONVERSION CRACKING PROCESS

[75] Inventors: Arthur W. Chester, Cherry Hill, N.J.; Albert B. Schwartz, Philadelphia, Pa.; William A. Stover, Woodbury, N.J.

[73] Assignee: Mobil Oil Corporation, New York, N.Y.

[21] Appl. No.: 850,183

[22] Filed: Nov. 10, 1977

[51] Int. Cl.² .................. B01J 8/24; C10G 11/04; C07C 15/02
[52] U.S. Cl. ....................... 208/120; 208/121; 252/477 R; 260/668 R; 423/328
[58] Field of Search .................................. 208/120

[56]  References Cited

U.S. PATENT DOCUMENTS

| | | | |
|---|---|---|---|
| 3,597,493 | 8/1971 | Frilette et al. | 260/666 |
| 3,764,520 | 10/1973 | Kimberlin et al. | 208/120 X |
| 3,769,202 | 10/1973 | Plank et al. | 208/120 X |
| 3,830,724 | 8/1974 | Schutt | 208/111 |
| 3,893,906 | 7/1975 | Garwood et al. | 208/138 X |
| 3,894,939 | 7/1975 | Garwood et al. | 208/135 X |
| 3,925,195 | 12/1975 | Scherzer et al. | 208/120 |
| 3,974,062 | 8/1976 | Owen et al. | 208/120 X |
| 3,974,063 | 8/1976 | Owen et al. | 208/120 |
| 4,001,106 | 1/1977 | Plank et al. | 208/75 |
| 4,002,557 | 1/1977 | Owen et al. | 208/120 |
| 4,064,039 | 12/1977 | Penick | 208/120 X |

OTHER PUBLICATIONS

Murphy (M. W. Kellogg) "Catalyst and Design Spur FCC Revival" Oil Gas Journal 11/23/70 pp. 72-78.

*Primary Examiner*—George Crasanakis
*Assistant Examiner*—G. E. Schmitkons
*Attorney, Agent, or Firm*—Charles A. Huggett; Raymond W. Barclay

[57]  ABSTRACT

A catalytic process is provided for cracking a hydrocarbon charge stock containing aromatic nuclei components and non-aromatic nuclei components which involves contacting such chargestock with a catalyst composition having an alkali metal content less than about 1.5 weight percent and containing a mixture of faujasite and mordenite in which contacting takes place under catalytic cracking conditions of such severity that the conversion level exceeds that attributable to conversion of the non-aromatic nuclei portion of the chargestock. Under such conditions, the coke yield is substantially lower than would be obtained with the same catalyst in the absence of mordenite at the same level of conversion.

15 Claims, No Drawings

SELECTIVE HIGH CONVERSION CRACKING PROCESS

BACKGROUND OF THE INVENTION

1. Field of the Invention

This invention relates to a process for cracking a hydrocarbon charge under conditions of high conversion utilizing a catalyst containing mordenite and faujasite.

2. Description of the Prior Art

Zeolite materials, both natural and synthetic, have been known in the past to have catalytic capability for various types of hydrocarbon conversion reactions. Thus, crystalline aluminosilicates of the faujasite type, e.g., zeolite X and zeolite Y, have been widely used in cracking catalysts for converting petroleum charge stocks, such as gas oil, to commercially attractive yields of gasoline. Representative prior art describing such processes include U.S. Pat. Nos. 3,140,249 and 3,140,253 to Plank and Rosinski.

It has also heretofore been known to employ mordenite, another crystalline aluminosilicate zeolite, either in the natural or synthetic form, as a hydrocarbon conversion catalyst. Thus, the use of acid mordenite as a catalyst for a wide variety of hydrocarbon conversion reactions including cracking is described in U.S. Pat. No. 3,597,493 to Frilette and Rubin.

Mixtures of various zeolites, including those of the faujasite type and mordenite, particularly when at least one of such zeolites is employed in the hydrogen form, have also been described as being useful in the conversion of petroleum hydrocarbons. Thus, U.S. Pat. No. 3,830,724 to Schutt describes a hydrocracking process utilizing a catalyst having Group VIII and/or Group VIB metals incorporated into a mixed zeolite support consisting of channel pore structure and three-dimensional pore structure zeolites of low alkali metal content. Representative of the channel pore structure zeolites is mordenite and representative of the three-dimensional pore structure zeolites is faujasite, either natural or synthetic, i.e., zeolite X or zeolite Y. At least one of the mixed zeolites and preferably both are in the hydrogen form, e.g., a typical mixed zeolite is one of hydrogen mordenite and hydrogen zeolite Y.

U.S. Pat. No. 3,925,195 to Scherzer describes a mixture of rare earth hydrogen Y type zeolite and hydrogen or transition metal exchanged mordenite as a hydrocarbon conversion catalyst. This catalyst is indicated to be useful in cracking petroleum charge stocks under conventional conditions of cracking.

U.S. Pat. No. 3,769,202 to Plank and Rosinski describes a catalytic cracking process in which a catalyst composition is employed comprising a mixture of discrete particles of a crystalline aluminosilicate having a pore size of less than 7 Angstrom units and a crystalline aluminosilicate having a pore size greater than 8 Angstrom units.

U.S. Pat. No. 3,764,520 to Kimberlin and Voorhies describes a hydrocarbon conversion process in which the catalyst used is a mixture of two different aluminosilicate zeolites having different ranges of pore size, i.e., 6–15 Angstroms and less than 6 Angstroms.

It has heretofore been recognized, as reported by J. R. Murphy in the Oil and Gas Journal for Nov. 23, 1970, that while zeolite catalysts have the ability to crack naphthenes, paraffins, or side chains containing these compounds rapidly and with excellent selectivity, these catalysts are ineffective in selectively cracking aromatic nuclei components. It was pointed out by the above author that the inability of zeolite catalysts to crack aromatic-nuclei selectively indicates that the limiting or optimum conversion is largely dictated by the aromatic content and particularly the polynuclear aromatic content. Since the polynuclear aromatic content generally decreases with decreasing boiling range, the selectivity in cracking light stocks is better than in cracking heavy stocks from the same crude source. But the ability of zeolite catalysts to crack low-boiling material is not all beneficial since it extends to nonaromatics in the gasoline boiling range. Thus, conditions of cracking must be chosen carefully to avoid recracking of gasoline.

The above publication indicates that overcracking of gasoline can be minimized by using mild conditions which only partially crack naphthenes and paraffins during initial contact with the catalyst. Recycle of the unconverted materials is thereafter necessary to obtain complete cracking of naphthenes and paraffins. Unfortunately, the cracking of polyaromatics in the recycle cannot be avoided in this type of operation. In addition to the poorer yields realized by substantial unselective cracking of polyaromatics, the rate of coke buildup on the catalyst is faster which adversely affects zeolite availability and the yields from cracking the naphthenes and paraffins.

It is concluded in the above publication that the objective in cracking gas oil with zeolite catalysts should be to maximize paraffin and napthene cracking while minimizing the polynuclear aromatic cracking and that considering the composition in the catalytic gas oils from high-conversion operations with zeolite catalysts, it is not probable that extensive cracking of the highly concentrated polyaromatic components is either possible or desirable.

SUMMARY OF THE INVENTION

In accordance with the present invention, there has been discovered a process for cracking a hydrocarbon chargestock containing aromatic nuclei components and non-aromatic nuclei components to effect a selective higher conversion with lower coke yields than heretofore attainable.

The process of the invention entails use of cracking catalyst made up of two crystalline aluminosilicate zeolite components. One of such zeolite components is of the faujasite type, i.e., natural faujasite or a synthetic faujasite, such as zeolite X or zeolite Y. The other of the zeolite components is mordenite. The two zeolite components are present in a mixture in which the weight ratio of faujasite to mordenite is within the approximate range of 30:1 to 1:5. Desirably, the zeolites are present in an inorganic oxide matrix, the total zeolite content of the composite being between about 5 to about 60 weight percent. The alkali metal content of the catalyst composition is less than about 1.5 weight percent. Preferably, the catalyst is subjected to a post treatment with rare earth or ammonium ion containing solutions so that after calcination the cationic sites of both zeolites are occupied by rare earth and/or hydrogen.

The conditions under which cracking is carried out utilizing the above specified catalyst is important to the success of the process of the invention. These conditions are of such severity that a conversion level is attained which exceeds that attributable to conversion of the non-aromatic nuclei portion of the chargestock.

Conversion conditions employed in the present process include a temperature in the range of about 900° to about 1200° F., a pressure between about atmospheric to about 100 psig, utilizing an oil contact time between about 0.5 second and about 15 minutes with a catalyst to oil ratio of between about 1 and about 20. It is emphasized that conversion conditions within the above-specified ranges, together with activity of the catalyst, are controlled to attain the aforenoted severity.

DESCRIPTION OF SPECIFIC EMBODIMENTS

In accordance with the present invention, it has now been discovered that improved selectivity, i.e., lower coke production, can be achieved at high conversions, when a low alkali metal cracking catalyst of mordenite and faujasite is employed under specified cracking conditions. It has been found that the use of the mordenite-faujasite catalysts, described herein for cracking, give lower coke yields at much higher conversions than presently practiced than would be found for similar catalysts not containing mordenite at the same conversions.

The coke formed during the cracking reaction is of profound importance in modern catalytic cracking units. The oxidation of the coke with air during regeneration provides the process heat required for the endothermic cracking of the feedstock. However, since coke is formed at the expense of valuable liquid products, the formation of excessive coke is undesirable. Further, many cracking units are constrained by the materials of construction to operate below the temperature allowed by these materials. The formation of excessive coke can raise the temperature during regeneration above such constraints and severely damage the unit. In such cases, either the degree of conversion or the throughput must be reduced in order to lower regeneration temperatures, thus giving a lower than desired yield of products. A catalyst which forms less coke during cracking when such a situation exists can therefore provide additional product.

An opposite situation can also occur. Some feedstocks for cracking can form too little coke to provide sufficient heat during regeneration to drive the cracking reaction. In such a case additional process heat must be provided, usually by combustion of valuable fuel to heat the feedstock. An alternative is to increase the conversion (e.g., by raising the reaction temperature) so that additional coke is formed. The additional coke is not generally accompanied by additional liquid product, since any such product is cracked to both gases and coke. A catalyst that is more selective at such conversions can therefore provide the additional coke required as well as additional liquid product.

Typical catalytic cracking chargestocks, such as gas oils, boiling in the 400°–1100° F. range, residua, shale oils and synthetic oils derived from coal are made up of a variety of hydrocarbons, which may be characterized as aromatic nuclei components, i.e., components which are characterized by the presence therein of aromatic rings and non-aromatic nuclei components, the latter comprising normal aliphatic, iso-aliphatic and naphthenic hydrocarbons. All chargestocks contain polynuclear aromatic components to some extent and these components cannot be directly cracked by conventional catalysts, either amorphous or zeolite-containing. At high conversion therefore, a maximum in the gasoline vs. conversion curve appears, primarily due to the re-cracking of gasoline product and the inability of the catalyst to selectively convert the aromatic remainder of the chargestock. Thus, the maximum yield of gasoline is generally limited by the phenomenon of overcracking. In commercial practice, maximum gasoline yields are obtained by adjusting operating parameters such that overall conversion is at or near the gasoline maximum and not at higher conversions, where higher coke and gas yields are obtained at the expense of gasoline.

The extent of aromatic nuclei components is conveniently expressed as $C_A$. This term is defined as the percent of carbon atoms in aromatic ring structures:

$$\%C_A = 100 \times C \text{ in aromatic rings/Total C in sample}$$

The value of $C_A$ is generally derived by the so-called "n-d-M" method, a correlation of refractive index, density and molecular weight. The "n-d-M" method has been described in detail by K. van Nes and H. A. van Westen in "Aspects of the Constitution of Mineral Oils", published in 1951 by the Elsevier Publishing Co., Inc. (pages 335-347 are particularly relevant). The $C_A$ value may also be determined by a combination of mass spectroscopy and other standard methods, such as described by M. E. Fitzgerald, J. L. Moiraso, H. Morgan and V. A. Cirillo in "Characterization of Gas Oil Stocks: An Integrated Analysis" in Applied Spectroscopy, Vol. 24, pages 106-114. This method allows a more detailed analysis of the types of aromatic rings present.

Coke formed on the catalyst during catalytic cracking is generally thought to be aromatic in nature. The aromatic nuclei portion of a chargestock, which is characterized by the $C_A$ value, is generally converted only after the other non-aromatic portions have been converted. In terms of conversion in percent volume, significant conversion of the $C_A$ portion does not occur until conversion values exceed approximately 100-$C_A$. On conventional catalysts, the $C_A$ portion converted is converted almost completely to coke.

Following the teachings of this invention, it has now been found that the combination of a faujasite type cracking component with mordenite in a catalyst allows selective cracking to much higher conversion than with either faujasite or mordenite alone. The faujasite component may be either naturally occurring faujasite or a synthetic faujasite, such as zeolite X or zeolite Y. The faujasite is preferably the rare earth form as a result of rare earth exchanging and calcining zeolite X or zeolite Y, but can be in the hydrogen form, e.g., HY. The mordenite component is generally in the synthetic hydrogen form, e.g., Norton H-Zeolon or the hydrogen form derived by heating tetraethylammonium (TEA) mordenite, but can be in other cationic form or present as naturally occurring mordenite. In general, the crystalline aluminosilicate zeolites are ordinarily ion exchanged either separately or in the final catalyst with a desired cation to replace alkali metal present in the zeolite as found naturally or as synthetically prepared. The exchange treatment is such as to reduce the alkali metal content of the final catalyst to less than about 1.5 weight percent and preferably less than about 0.5 weight percent. The purpose of ion exchange is to substantially remove alkali metal cations which are known to be deleterious to cracking, as well as to introduce particularly desired catalytic activity by means of the various cations used in the exchange medium. For the cracking operation described herein, preferably cations are hydrogen, ammonium, rare earth and mixtures thereof, with particular preference being accorded rare earth. Ion exchange is suitably accomplished by conventional contact of the zeolite or catalyst with a suitable salt solution of the desired cation, such as for example, the sulfate, chloride or nitrate. It is also contemplated that the above zeolites, i.e., faujasite and mordenite can be synthesized in situ in a matrix of inorganic oxide, raw or calcined clay, or mixtures thereof.

The components of faujasite and mordenite can be employed either alone in the form of a mixture of separate particles or combined together in a suitable inorganic oxide matrix. The latter form catalyst is generally preferred, being characterized by a high resistance to attrition, high activity and exceptional steam stability. Such catalysts are readily prepared by dispersing the two zeolites in a suitable siliceous sol and gelling the sol by various means. The inorganic oxide which serves as the matrix in which the above zeolites are distributed include silica gel or a cogel of silica and a suitable metal oxide. Representative cogels include silica-alumina, silica-magnesia, silica-zirconia, silica-thoria, silica-beryllia, silica-titania, as well as ternary combinations such as silica-alumina-magnesia, silica-alumina-zirconia and silica-magnesia-zirconia. Preferred cogels include silica-alumina, silica-zirconia or silica-alumina-zirconia. The above gels and cogels will generally comprise a major proportion of silica and a minor proportion of the other aforementioned oxide or oxides. Thus, the silica content of the siliceous gel or cogel matrix will generally fall within the range of 55 to 100 weight percent, preferably 60 to 95 weight percent and the other metal oxide or oxides content will generally be within the range of 0 to 45 weight percent and preferably 5 to 40 weight percent. In addition to the above, the matrix may also comprise natural or synthetic clays, such as kaoline type clays, montmorillionite, bentonite or halloysite. These clays may be used either alone or in combination with silica or any of the above specified cogels in matrix formation.

Where a matrix is used, content of crystalline aluminosilicate zeolite, i.e., the amount of the faujasite component is generally between about 5 and about 30 weight percent and preferably between about 10 and about 25 weight percent and the amount of the mordenite component is generally between about 1 and about 30 weight percent and preferably between about 5 and about 25 weight percent based on the total catalyst composition. Ion exchange of the zeolites to replace their initial alkali metal content can be accomplished either prior to or subsequent to incorporation of the zeolites into the matrix. When the mixture of zeolites is used without a matrix, the two zeolites are suitably ground or milled together and then granulated or pelleted for use. Alternatively, the two zeolites may be separately pelleted or granulated followed by mixing of the pellets or granules.

The above compositions may be readily processed so as to provide fluid cracking catalysts by spray drying the composite to form microspheriodal particles of suitable size. Alternatively, the composition may be adjusted to suitable concentration and temperature to form bead type catalyst particles suitable for use in moving bed type cracking systems. The catalyst may also be used in various other forms such as those obtained by tabletting, balling or extruding.

It is to be realized that the aforenoted catalytic cracking conditions and particularly a temperature in the range of about 900° F. to about 1200° F., an oil contact time between 0.5 second and about 15 minutes and a catalyst to oil ratio of between about 1 and about 20 are controlled, along with activity of the catalyst employed, at such severity that the conversion level exceeds that attributable to conversion of the non-aromatic nuclei portion of the catalytic cracking charge stock. Severity can be increased by increasing the temperature, the contact time and/or the catalyst/oil ratio within the aforenoted ranges. The activity of the catalyst can be increased by increasing the fresh catalyst make-up rate and/or the crystalline aluminosilicate content thereof. In accordance with the procedure of the invention, the recited catalytic cracking conditions and activity of the catalyst are controlled such that the severity thereof is such as to afford a conversion level in excess of that which would be realized by conversion of the non-aromatic nuclei portion only of the charge stock.

The above catalysts can be used advantageously in conjunction with a CO-oxidation component, such as a platinum group metal, i.e., platinum, palladium, rhenium, osmium, iridium or ruthenium in an amount of 0.1 ppm to 100 ppm.

The following examples will serve to illustrate the process of the invention without limiting the same.

EXAMPLES 1–6

A series of catalysts comprising combinations of rare earth exchanged zeolite Y (REY) and mordenite incorporated in a silica-alumina-clay matrix were prepared as detailed below:

The REY in the examples resulted from ion exchange of the sodium form of zeolite Y such that 68% of the sodium cations had been replaced by rare earth cations, including Sm, Nd, Pr, Ce and La having the distribution indicated hereinbelow. After ion exchange, the resulting REY product was calcined for about 10 minutes at 1200° F. The composition of the REY and the other zeolites employed, i.e., mordenite and tetraethylammonium (TEA) mordenite are hereinafter shown in Table I.

TABLE I

| Zeolite | REY | H-Mordenite[a] | TEA Mordenite |
|---|---|---|---|
| Na, % Wt. | 3.2 | 0.16 | 2.28 |
| $RE_2O_3$, % Wt. | 15.9[b] | — | — |
| $SiO_2$, % Wt. | 61.4 | 83.5 | 84.4 |
| $Al_2O_3$, % Wt. | 21.7 | 9.4 | 6.8 |
| N, % Wt. | — | — | 0.31 |
| C, % Wt. | — | — | 0.50 |

[a]Commercial Norton H-Zeolon

| | | | |
|---|---|---|---|
| [b]$Sm_2O_3$ | = | 0.10% | .6 |
| $Nd_2O_3$ | = | 3.70% | 23.2 |
| $Pr_6O_{11}$ | = | 1.05% | 6.6 |
| $CeO_2$ | = | 1.61% | 10.1 |
| $La_2O_3$ | = | 9.47% | 59.5 |
| | | 15.93 | 100.0 |

The zeolites were incorporated in a gel matrix consisting of 60.45% $SiO_2$, 4.55% $Al_2O_3$ and 35% clay. The matrix was prepared by forming a slurry of 407.5 parts by weight of kaolin clay and 2101.4 parts by weight of sodium silicate (28.8% wt. $SiO_2$ and 8.8% $Na_2O$) with 10,000 parts by weight of water and acidifying the slurry at 120° F. with concentrated sulfuric acid to a pH of about 10.7. The resulting gel which formed was aged by heating at 120° F. for 30 minutes and thereafter cooled to ambient temperature. Alumina was then incorporated by slowly adding 1328 parts by weight of a 20 wt. percent aqueous solution of aluminum sulfate (17.7% $Al_2O_3$). After addition of aluminum sulfate, the pH was about 4.5.

To the clay-gel mixture so formed, the appropriate zeolites were added. The resulting composite of zeolite and matrix was homogenized and thereafter spray dried with an inlet temperature of 700° F. and an outlet temperature of 350° F.

The resulting spray dried product was ion exchanged with 5% aqueous ammonium sulfate solution, then water washed substantially free of sulfate. The washed product was then further ion exchanged with 1% aqueous solution of rare earth chloride to provide catalyst compositions having the $RE_2O_3$ content and distribution shown hereinbelow. The ion exchanged product was then washed substantially free of chloride with water. In the catalysts of Examples 2, 3 and 4, an oxidation promoter was incorporated at this stage by slurrying the washed wet cake with a solution containing sufficient $Pt(NH_3)_4Cl_2$ to deposit 1.5 ppm of platinum on the catalyst. After filtering, the wet cake was dried at 250° F. for about 40 hours.

The catalysts prepared in the above manner, their compositions, chemical and physical properties are hereinafter shown in Table II.

properties hereinafter set forth in Table III, at 935° F. in a fixed fluidized bed test unit.

TABLE III

| | |
|---|---|
| API Gravity | 29.2 |
| Sulfur, % Wt. | 0.51 |
| Nitrogen, % Wt. | 0.065 |
| Basic Nitrogen, ppm | 152 |
| Conradson Carbon, % Wt. | 0.29 |
| Aniline Point, ° F | 181 |
| Bromine Number | 2.5 |
| Refractive Index at 70° F | 1.48852 |
| Pour Point, ° F | 85 |
| Viscosity, KV at 210° F | 3.55 |
| Molecular Wt. | 328 |
| Hydrogen, % Wt. | 13.06 |
| Specific Gravity, 60/60° F | 0.8767 |
| Metals, Ni,ppm | 0.1 |
| V,ppm | 0.2 |
| Fe,ppm | 32 |
| Distillation, ° F | |
| IBP | 472 |
| 5% vol | 545 |
| 10 | 578 |
| 20 | 608 |
| 30 | 632 |
| 40 | 665 |
| 50 | 707 |
| 60 | 754 |
| 70 | 796 |
| 80 | 851 |
| 90 | 920 |
| 95 | 958 |

TABLE II

| Example | 1 | 2 | 3 | 4 | 5 | 6 |
|---|---|---|---|---|---|---|
| % REY | 15 | 15 | 15 | 10 | 10 | 0 |
| 2nd Zeolite | — | — | H-Mord. | H-Mord. | TEA-Mord. | H-Mord. |
| % 2nd Zeolite | — | — | 5 | 15 | 15 | 25 |
| Oxidation Promotor (ppm-Pt) | — | 1.5 | 1.5 | 1.5 | — | — |
| Chemical Analyses | | | | | | |
| Na, % Wt. | 0.06 | 0.07 | 0.06 | 0.05 | 0.06 | 0.04 |
| $RE_2O_3$, % Wt. | 5.47 | 4.68 | 4.66 | 3.82 | 4.38 | 1.80 |
| $Sm_2O_3$, % Wt. | 0.05 | 0.04 | 0.03 | <0.03 | 0.04 | <0.03 |
| $Nd_2O_3$, % Wt. | 1.33 | 1.05 | 1.04 | 0.84 | 1.07 | 0.49 |
| $Pr_6O_{11}$, % Wt. | 0.46 | 0.34 | 0.35 | 0.29 | 0.34 | 0.16 |
| $CeO_2$, % Wt. | 0.59 | 0.62 | 0.62 | 0.53 | 0.60 | 0.21 |
| $La_2O_3$, % Wt. | 3.05 | 2.64 | 2.5 | 2.13 | 2.33 | 0.92 |
| $SiO_2$, % Wt. | 70.9 | 72.1 | 65.0 | 71.3 | 72.6 | 76.3 |
| $Al_2O_3$, % Wt. | 17.8 | 18.2 | 18.4 | 16.8 | 16.5 | 16.1 |
| Physical Properties[a] | | | | | | |
| Pore Volume[b] cc/gm | 0.49 | 0.41 | 0.46 | 0.38 | 0.51 | 0.44 |
| Packed Density, gm/cc | 0.60 | 0.67 | 0.70 | 0.55 | 0.59 | 0.49 |
| Surface Area, $m^2$/gm | 170 | 172 | 175 | 182 | 157 | 181 |
| Average Diameter, microns | 64 | 62 | 67 | 66 | 59 | 53 |

[a]After steaming for 4 hours - 1400° F - O psig, 100% steam;
[b]water.

EXAMPLES 7-12

The freshly prepared catalysts of Examples 1-6 were each steamed for 4 hours at 1400° F. at 0 psig in 100 percent steam in a fixed fluidized bed. In each instance, the catalysts were preheated to 1350° F. in steam, then to 1400° F. in nitrogen before beginning the 4 hours steaming. The steamed catalysts were then tested for cracking activity and selectivity by cracking a Wide-Cut Mid-Continent Gas Oil (WCMCGO), having the

| | |
|---|---|
| Paraffins, % Wt. | 28 |
| Naphthenes, % Wt. | 35 |
| Aromatics, % Wt. | 37 |
| Aromatic Rings, $C_A$ | 15 |

A series of cracking tests were run at a severity such that high conversions typical of commercial units were attained, but not at a severity sufficiently high that cracking of polynuclear aromatic nuclei occurred. Conversion conditions and representative data obtained are summarized in Table IV below.

TABLE IV

| Example | 7 | 8 | 9 | 10 | 11 | 12 |
|---|---|---|---|---|---|---|
| Catalyst Example | 1 | 2 | 3 | 4 | 5 | 6 |
| % REY | 15 | 15 | 15 | 10 | 10 | 0 |
| 2nd Zeolite | — | — | H-Mord. | H-Mord. | TEA-Mord. | H-Mord. |
| % 2nd Zeolite | — | — | 5 | 15 | 15 | 25 |
| Oxidation Promoter | No | Yes | Yes | Yes | No | No |
| FCC Bench Test | | | | | | |
| Initial Temp. ° F | 935 | 935 | 935 | 935 | 935 | 935 |
| Catalyst/Oil | 3 | 3 | 3 | 4 | 4 | 3 |
| WHSV | 8.3 | 8.3 | 8.3 | 6.25 | 6.25 | 8.3 |
| Conversion, % Vol. | 82.6 | 82.2 | 82.3 | 83.2 | 82.7 | 34.4 |
| $C_5^+$ Gasoline, % Vol. | 65.4 | 64.6 | 65.3 | 64.3 | 64.7 | 32.2 |
| Total $C_4$'s | 17.8 | 19.2 | 17.9 | 18.6 | 19.3 | 3.6 |
| Dry Gas, % Wt. | 8.0 | 8.1 | 8.0 | 8.0 | 8.2 | 2.8 |
| Coke, % Wt. | 4.2 | 4.0 | 4.1 | 4.4 | 4.4 | 1.2 |
| Carbon-on-Cat, % Wt. | 1.20 | 1.15 | 1.17 | 0.94 | 0.96 | 0.34 |
| Selectivity | | | | | | |

TABLE IV-continued

| | | | | | | |
|---|---|---|---|---|---|---|
| Gasoline/Conversion × 100 | 79.2 | 78.6 | 79.3 | 78.5 | 78.2 | — |
| Conversion/Coke | 19.7 | 20.6 | 20.1 | 18.9 | 18.6 | — |
| Gasoline/Coke | 15.6 | 16.2 | 15.9 | 14.8 | 14.6 | — |
| Octanes RON + O, $C_5^+$ Gasoline | 85.7 | 85.9 | 85.5 | 85.9 | 85.5 | 84.5 |

EXAMPLES 13-18

Another series of cracking tests were carried out at sufficiently high severity that conversion exceeded that attributable to conversion of non-aromatic nuclei, i.e., for WCMCGO, 100-$C_A$ ≧ 85 percent volume conversion. Conversion conditions and representative data obtained are shown in Table V below.

TABLE V

| Example | 13 | 14 | 15 | 16 | 17 | 18 |
|---|---|---|---|---|---|---|
| Catalyst Example | 1 | 2 | 3 | 4 | 5 | 6 |
| % REY | 15 | 15 | 15 | 10 | 10 | 0 |
| 2nd Zeolite | — | — | H-Mord. | H-Mord. | TEA-Mord. | H-Mord. |
| % Zeolite | — | — | 5 | 15 | 15 | 25 |
| Oxidation Promoter | No | Yes | Yes | Yes | No | No |
| FCC Bench Test | | | | | | |
| Initial Temp. °F | 935 | 935 | 935 | 935 | 935 | 935 |
| Catalyst/Oil | 5 | 5 | 5 | 5 | 5 | 5 |
| WHSV | 5 | 5 | 5 | 5 | 5 | 5 |
| Conversion, % Vol. | 88.1 | 89.1 | 88.1 | 86.9 | 85.7 | 57.4 |
| $C_5^+$ Gasoline, % Vol. | 63.5 | 64.6 | 64.9 | 65.6 | 65.0 | 49.5 |
| Total $C_4$'s, % Vol. | 21.8 | 22.7 | 20.5 | 19.6 | 20.4 | 9.8 |
| Dry Gas, % Wt. | 9.9 | 10.0 | 9.5 | 8.7 | 9.3 | 4.9 |
| Coke, % Wt. | 6.6 | 7.0 | 6.9 | 5.5 | 5.3 | 2.1 |
| Carbon-on-Cat, % Wt. | 1.13 | 1.17 | 1.18 | 0.94 | 0.90 | 0.36 |
| Selectivity | | | | | | |
| Gasoline/Conversion × 100 | 72.0 | 72.5 | 73.7 | 75.5 | 75.8 | — |
| Conversion/Coke | 13.3 | 12.7 | 12.8 | 15.8 | 16.2 | — |
| Gasoline/Coke | 9.6 | 9.2 | 9.4 | 11.9 | 12.2 | — |
| Octane RON + O, $C_5^+$ Gasoline | 88.0 | 87.1 | 86.3 | 86.0 | 86.3 | 86.8 |

From the data in Tables IV and V, it will be seen that a series of selectivity parameters relating gasoline and coke yields to conversion are presented. Under the conversion conditions utilized in summarizing the data of Table IV, where conversion of aromatic nuclei does not occur, the selectivity parameters of Examples 7-12 are very similar, indicating that the added zeolite had little effect on selectivity.

Under the high severity conditions utilized in obtaining the data of Table V, however, where conversion of aromatic nuclei occurs, the catalysts containing mordenite exhibit much improved selectivity when compared to results obtained using catalyst which did not contain mordenite. For example, the mordenite-containing catalyst used in Example 16 shows a 4% higher gasoline/conversion ratio and in particular a 24% greater coke selectivity (conversion/coke) than the corresponding catalyst of Example 14 which did not contain mordenite. Likewise, comparison of TEA-mordenite-containing Example 17 with the similar non-mordenite catalyst of Example 13 showed a 5% increase in gasoline/conversion and a 22% increase in coke selectivity. Thus, the presence of mordenite in the catalyst affords more selective products when aromatic nuclei are converted.

The data of Examples 12 and 18 in Tables IV and V respectively demonstrate that mordenite alone does not have sufficient activity for high conversion of the non-aromatic nuclei portion of the charge stock, even under conditions of high severity.

It is to be understood that the foregoing description is merely illustrative of preferred embodiments of the invention of which many variations may be made by those skilled in the art within the scope of the following claims without departing from the spirit thereof.

We claim:

1. A process for cracking a hydrocarbon chargestock containing aromatic nuclei components and non-aromatic nuclei components which comprises contacting said chargestock with a catalyst composition:
   (1) characterized by an alkali metal content of less than about 1.5 weight percent and
   (2) comprising a mixture of faujasite and mordenite in which the weight ratio of faujasite to mordenite is within the approximate range of 30:1 to 1:5 said contacting taking place under catalytic cracking conditions, including a temperature in the range of about 900° to about 1200° F., a pressure between about atmospheric and about 100 psig, an oil contact time between about 0.5 second and about 15 minutes and a catalyst to oil ratio of between about 1 and about 20, the activity of said catalyst and said conditions being controlled such that severity of the conversion level exceeds that attributable to conversion of the non-aromatic nuclei portion of said charge stock with a resultant coke yield lower than that obtainable with the same catalyst in the absence of mordenite at the same level of conversion.

2. The process of claim 1 wherein said faujasite and mordenite are in the rare earth, hydrogen or ammonium form.

3. The process of claim 1 wherein said faujasite is a synthetic faujasite.

4. The process of claim 3 wherein said synthetic faujasite is zeolite X.

5. The process of claim 3 wherein said synthetic faujasite is zeolite Y.

6. The process of claim 1 wherein said mixture of faujasite and mordenite are contained in an inorganic oxide matrix.

7. The process of claim 1 wherein said faujasite and mordenite are contained in separate fluid particles.

8. The process of claim 1 wherein said mixture of faujasite and mordenite is in the form of a fluid cracking catalyst.

9. The process of claim 1 wherein said mixture of faujasite and mordenite is in the form of particles suitable for use in moving bed type cracking systems.

10. The process of claim 1 wherein said chargestock is a gas oil.

11. The process of claim 1 wherein said alkali metal content is less than about 0.5 weight percent.

12. The process of claim 1 wherein faujasite is in the rare earth form and mordenite is in the hydrogen form.

13. The process of claim 1 wherein said catalyst contains, as a CO oxidation component, a platinum group metal in an amount of 0.1 ppm to 100 ppm.

14. The process of claim 6 wherein the faujasite component is present in an amount between about 5 and about 30 weight percent and the mordenite component is present in an amount between about 1 and about 30 weight percent of the catalyst composition.

15. The process of claim 6 wherein the faujasite component is present in an amount between about 10 and about 25 weight percent and the mordenite component is present in an amount between about 5 and about 25 weight percent of the catalyst composition.

* * * * *

UNITED STATES PATENT AND TRADEMARK OFFICE
CERTIFICATE OF CORRECTION

PATENT NO. : 4,137,152
DATED : January 30, 1979
INVENTOR(S) : ARTHUR W. CHESTER, ALBERT B. SCHWARTZ and WILLIAM A. STOVER It is certified that error appears in the above-identified patent and that said Letters Patent are hereby corrected as shown below:

Column 6, line 51, Delete column beginning ".6".

Column 6, line 53, "$Pr_6O_{II}$" should read --$Pr_6O_{11}$--.

Signed and Sealed this

Twenty-second Day of May 1979

[SEAL]

Attest:

RUTH C. MASON
Attesting Officer

DONALD W. BANNER
Commissioner of Patents and Trademarks